(12) United States Patent
Henry

(10) Patent No.: US 11,558,990 B2
(45) Date of Patent: Jan. 24, 2023

(54) SYSTEM AND METHOD FOR DETECTING A PLUG OF A TOOL OF A TILLAGE IMPLEMENT

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 300 days.

(21) Appl. No.: 16/540,653

(22) Filed: Aug. 14, 2019

(65) Prior Publication Data

US 2021/0045278 A1 Feb. 18, 2021

(51) Int. Cl.
*A01B 63/112* (2006.01)
*A01B 9/00* (2006.01)
*G01L 5/00* (2006.01)
*A01B 76/00* (2006.01)
*A01B 33/02* (2006.01)

(52) U.S. Cl.
CPC ............ *A01B 63/112* (2013.01); *A01B 9/003* (2013.01); *G01L 5/0061* (2013.01); *A01B 33/024* (2013.01); *A01B 76/00* (2013.01)

(58) Field of Classification Search
CPC ..... A01B 63/112; A01B 9/003; A01B 33/024; A01B 76/00; G01L 5/0061
See application file for complete search history.

(56) References Cited

U.S. PATENT DOCUMENTS

| | | | |
|---|---|---|---|
| 3,283,838 A | 11/1966 | Fetterman et al. | |
| 3,814,188 A | 6/1974 | Ahne | |
| 4,086,576 A | 4/1978 | Jebb et al. | |
| 4,160,485 A * | 7/1979 | McLean | A01B 63/112 172/3 |
| 4,434,857 A * | 3/1984 | Basrai | A01B 63/112 91/171 |
| 5,348,101 A * | 9/1994 | Fox et al. | A01B 63/22 172/316 |
| 6,314,818 B1 | 11/2001 | Mandon | |
| 6,525,276 B1 | 2/2003 | Vellidus et al. | |

(Continued)

OTHER PUBLICATIONS

PCT International Search Report and Written Opinion issued in corresponding Application No. PCT/IB2020/057597 dated Oct. 16, 2020 (10 pages).

*Primary Examiner* — Tara Mayo-Pinnock
(74) *Attorney, Agent, or Firm* — Rebecca Henkel; Rickard Demille

(57) ABSTRACT

A system for detecting the operational status of a ground engaging tool of a tillage implement including an agricultural implement including a frame and a tool assembly supported relative to the frame. The ganged tool assembly includes a toolbar coupled to the frame and one or more ground engaging tools coupled to the toolbar. The system further includes a sensor coupled to the tool assembly and configured to capture data indicative of a load acting on the one or more ground engaging tools. Additionally, the system includes a controller configured to monitor the data received from the sensor and compare at least one monitored value associated with the load acting on the ground engaging tool(s). Moreover, the controller is further configured to identify the ground engaging tool(s) as being plugged when the monitored value(s) differs from the predetermined threshold value.

20 Claims, 5 Drawing Sheets

(56) References Cited

U.S. PATENT DOCUMENTS

| | | | |
|---|---|---|---|
| 8,275,525 | B2 | 9/2012 | Kowalchuk et al. |
| 9,359,177 | B2 | 6/2016 | Maynard et al. |
| 9,485,900 | B2 | 11/2016 | Connell et al. |
| 9,669,886 | B2 | 6/2017 | Sidles |
| 9,803,342 | B2 | 10/2017 | Chitty et al. |
| 2013/0018552 | A1 | 1/2013 | Foster et al. |
| 2013/0082846 | A1 | 4/2013 | McKinley et al. |
| 2014/0081555 | A1 | 3/2014 | Seelke et al. |
| 2015/0020612 | A1 | 1/2015 | Witt et al. |
| 2015/0296701 | A1 | 10/2015 | Anderson |
| 2016/0088787 | A1 | 3/2016 | Connell et al. |
| 2017/0008739 | A1 | 1/2017 | Nguyen et al. |
| 2017/0120709 | A1* | 5/2017 | Tuttle .................... A01B 76/00 |
| 2018/0124991 | A1 | 5/2018 | Knobloch |
| 2018/0352718 | A1 | 12/2018 | Kovach et al. |
| 2019/0235529 | A1 | 8/2019 | Barrick et al. |

\* cited by examiner

SYSTEM AND METHOD FOR DETECTING A PLUG OF A TOOL OF A TILLAGE IMPLEMENT

FIELD OF THE INVENTION

The present disclosure generally relates to tillage implements and, more particularly, to systems and methods for detecting the operational status of ground engaging tools of a tillage implement based on the load acting on the ground engaging tools.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

However, in certain situations, the ground engaging tools may become plugged with debris and no longer efficiently engage the ground. For example, dirt clogs or left over crop residue may become trapped between the ground engaging tool and the ground and reduce a desired penetration depth of the ground tools. As another example, the plug may form in front of a ground engaging tool relative to a direction of motion of the tillage implement. As such, the ground engaging tool may plow such plug and thereby suffer from undesirable loading and premature mechanical failure Accordingly, an improved system and method for detecting the operational status of ground engaging tools of a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting the operational status of a ground engaging tool of a tillage implement. The system includes an agricultural implement including a frame and a tool assembly supported relative to the frame. The tool assembly includes a toolbar coupled to the frame and one or more ground engaging tools coupled to the toolbar. The system further includes a sensor coupled to the tool assembly and configured to capture data indicative of a load acting on the one or more ground engaging tools. Additionally, the system includes a controller configured to monitor the data received from the sensor and compare at least one monitored value associated with the load acting on the ground engaging tool(s). Moreover, the controller is further configured to identify the ground engaging tool(s) as being plugged when the monitored value(s) differs from the predetermined threshold value.

In another aspect, the present subject matter is directed to a method for detecting the operational status of at least one ground engaging tool of a tillage implement. The implement includes an implement frame and a tool assembly supported relative to the frame. The tool assembly includes a toolbar coupled to the frame and one or more ground engaging tools coupled to the toolbar. The method includes controlling, with a computing device, an operation of the tillage implement as the implement is being moved across the field. The method also includes monitoring, with the computing device, a load acting on one or more ground engaging tools based on data received from a sensor associated with the tool assembly. The method further includes comparing one or more monitored values associated with the load acting on the ground engaging tool(s) to a predetermined threshold value set for the ground engaging tool(s). Additionally, the method includes identifying that the ground engaging tool(s) is plugged when the monitored value(s) differs from the predetermined threshold value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
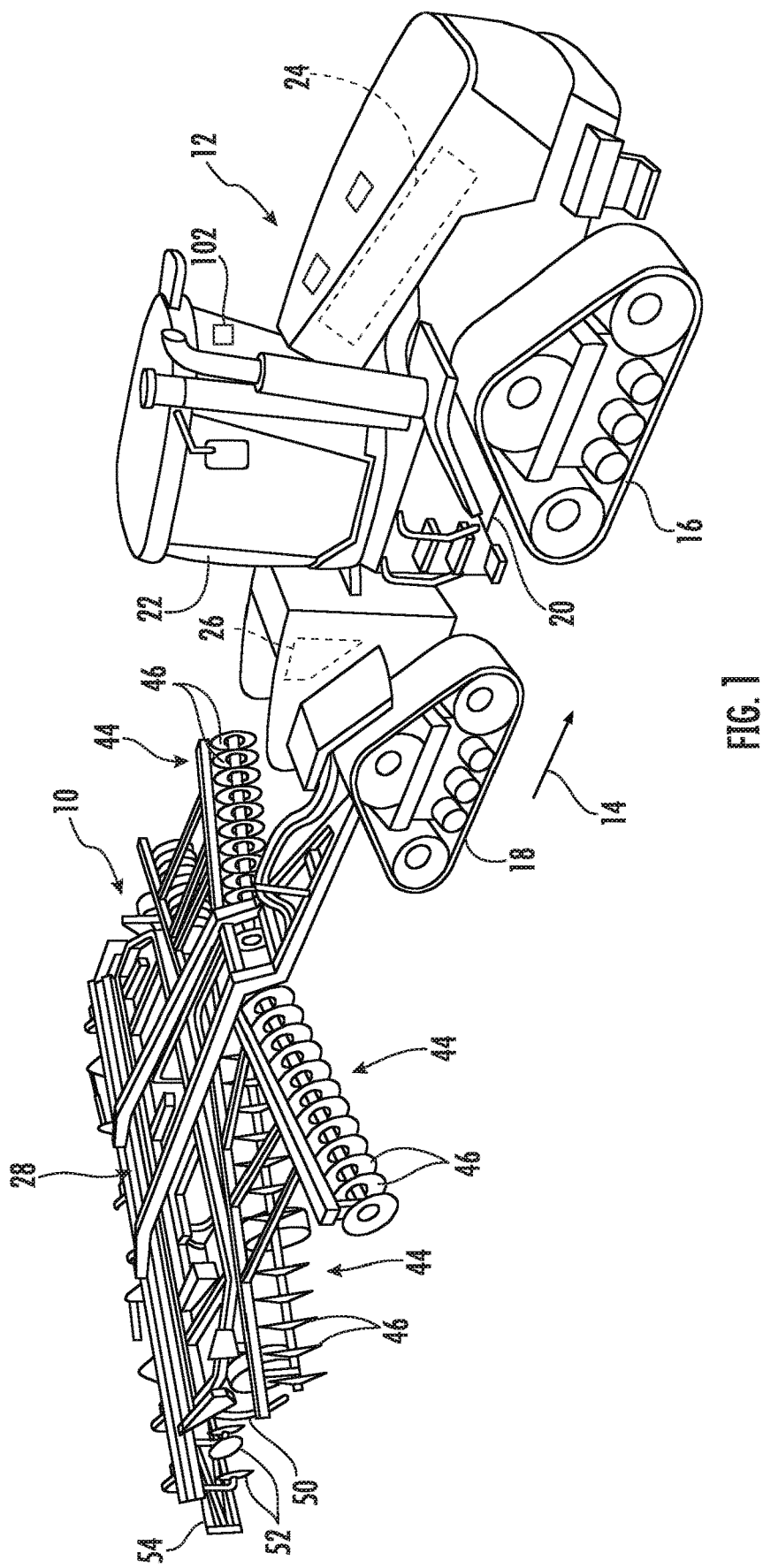
FIG. 1 illustrates a perspective view of one embodiment of a tillage implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the operational status of a ground engaging tool of a tillage implement. Specifically, in several embodiments, a controller of the disclosed system may be configured to receive data indicative of a draft load applied to one or more ground engaging tools of the implement, such as to disc blades supported by a ganged disc assembly. The draft load applied to the ground engaging tool(s) may, in turn, be indicative of the operational status of the ground engaging tool(s). For instance, the controller may be configured to monitor the data received from one or more force sensors associated with the ground engaging tool(s) and/or a ganged tool assembly associated with such ground engaging tools and compare a monitored value to a predetermined threshold value set for the ground engaging tool(s). For example, the ground engaging tool(s) may be one or more disc blades attached to a hanger of a ganged disc assembly. In such a circumstance, the sensor may be coupled to the hanger of the ganged disc assembly to communicate data indicative of the draft load on the disc blade(s).

In several embodiments, the operational status being monitored may be associated with clogging or plugging of the ground engaging tool(s). Specifically, a deviation in the monitored load applied to the ground engaging tool(s) relative to a predetermined threshold value(s) as the implement is being towed across the field to perform a cultivating operation may be indicative of plugging of the ground engaging tool(s), such as when the draft load surpasses a set maximum load value, falls below a set minimum load value, and/or when a reduction in a range of loads acting on the ground engaging tool(s) is detected. As such, the controller may be configured to identify that the ground engaging tool(s) is plugged when the monitored load value differs from the predetermined threshold value(s) set for the ground engaging tool(s). The identification of a plugged ground engaging tool(s) may allow for the operator to take corrective action. Alternatively, the controller may be configured to automatically execute a corrective action adapted to unplug the ground engaging tool(s).

Figure 2:
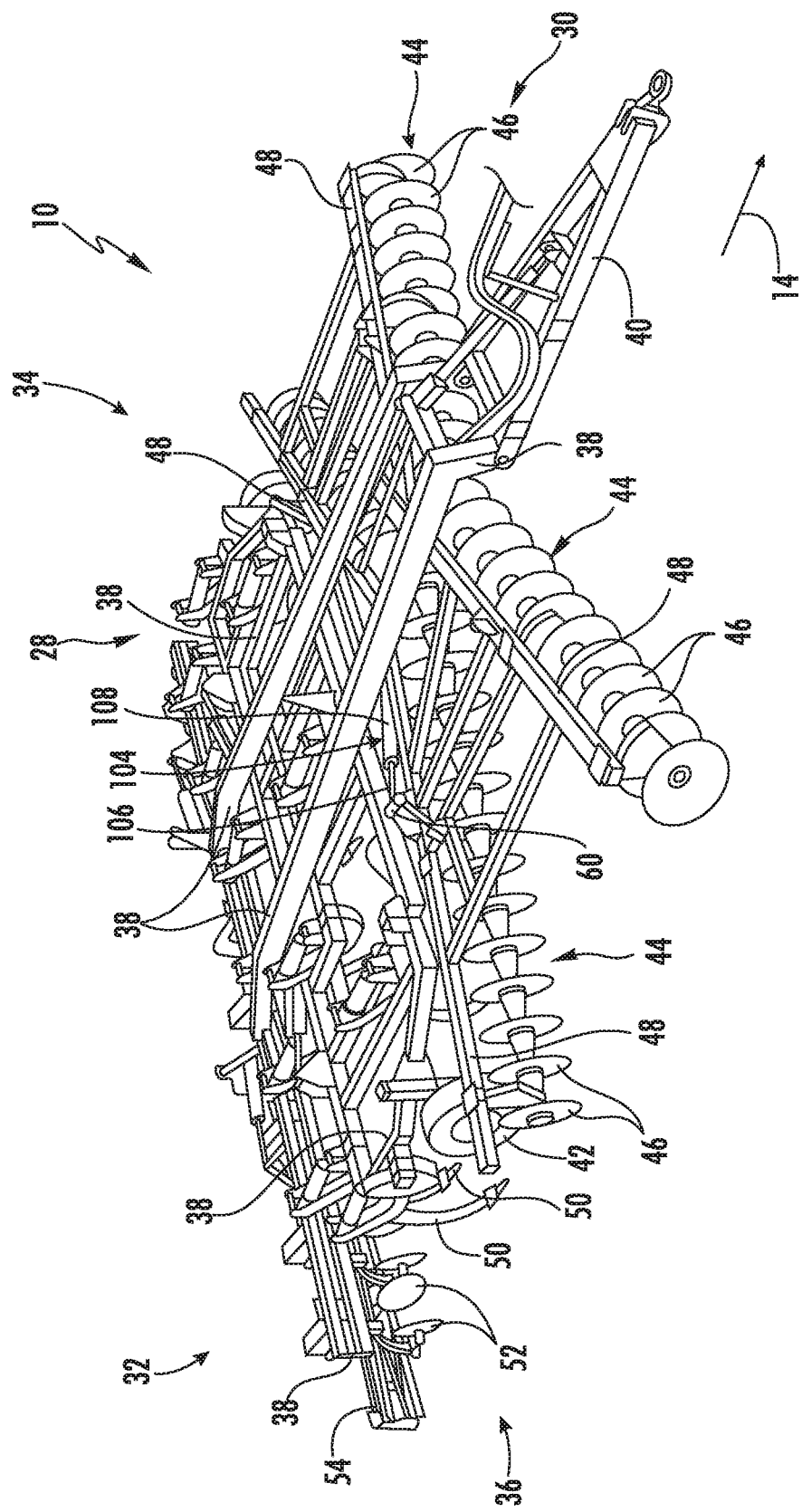
FIG. 2 illustrates an alternative perspective view of the tillage implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32.

Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. Furthermore, the rod 106 of each actuator 104 may be configured to extend and/or retract relative to the corresponding cylinder 108 to adjust a downforce applied by the actuator(s) 104 to the disk gang assembly 44, and thus the disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground engaging tools. For instance, in the illustrated embodiment, the frame 28 is also configured to support a plurality of leveling blades 52 and rolling (or crumbler) basket assemblies 54. In other embodiments, any other suitable ground engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
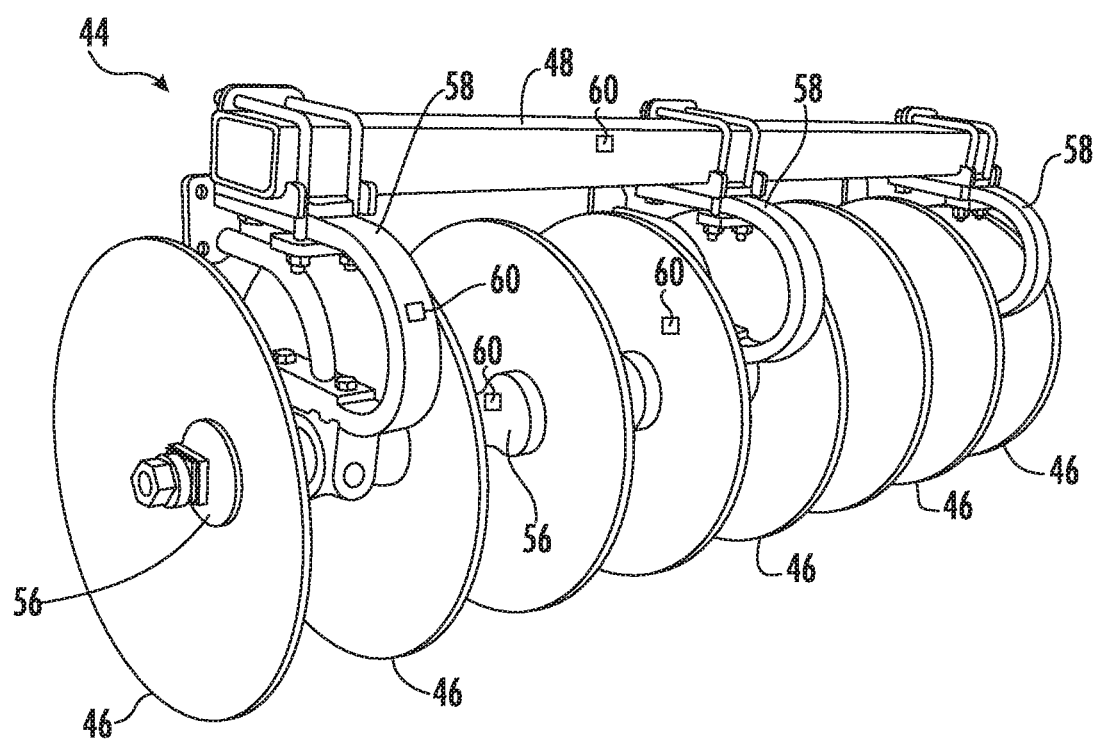
FIG. 3 illustrates a perspective view of a ganged tool assembly of the implement in accordance with aspects of the present subject matter, particularly illustrating the ganged tool assembly configured as a disc gang assembly of the tillage implement.

Referring now to FIG. 3, one example implementation of a ganged tool assembly described above in reference to FIGS. 1 and 2 is illustrated in accordance with aspects of the present subject matter. Specifically. FIG. 3 illustrates a perspective view of various components of the disc gang assemblies 44 of the implement 10 described above with reference to FIGS. 1 and 2. However, it should be appreciated that the aspects of ganged tool assembly described herein with reference to FIG. 3 may also be utilized with any other ganged tool assembly including any other suitable ground engaging tools of a given agricultural implement 10.

As shown in FIG. 3, the disc gang assembly 44 may include a plurality of disc blades 46 rotatably coupled to and spaced apart along the length of a disc gang shaft 56. The disc gang shaft 56 may, in turn, be positioned underneath and coupled to the toolbar 48 of the disc gang assembly 44 via one or more hangers 58 of the disc gang assembly 44. For example, in the illustrated embodiment, the hangers 58 define a C-shape that permits the disc gang shaft 56 and the disc blades 46 mounted thereon to move relative to the toolbar 48. However, it should be appreciated that, in alternative embodiments, the hanger(s) 58 may have any other suitable configuration. Furthermore. FIG. 3 illustrated a ganged tool assembly, but it should be recognized that following disclosure is generally applicable to a tool assembly including a single ground engaging tool coupled to the frame of the agricultural implement. For example, in certain situations, a single ground engaging tool or multiple ground engaging tools may be coupled to the toolbar 48 utilizing individual hangers 58 associated with each ground engaging tool.

Figure 4:
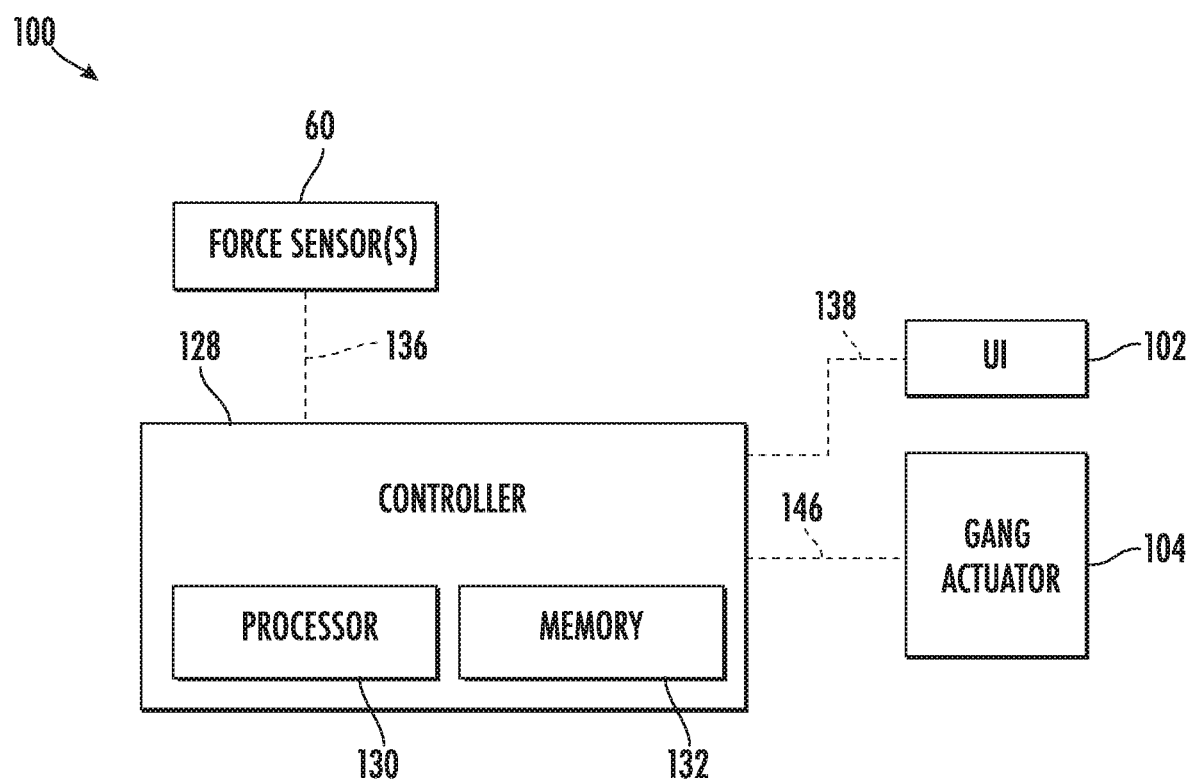
FIG. 4 illustrates a schematic view of one embodiment of a system for detecting the operational status of a ground engaging tool of the tillage implement in accordance with aspects of the present subject matter.

Additionally, in accordance with aspects of the present subject matter, the ganged disc assembly 44 may include one or more force sensors 60 configured to detect a load acting one or more components of the disc gang assembly 44 as the implement 10 is being moved across the field and transmit associated load data to a corresponding system controller 128 (such as via one or more communicative links 136 omitted for clarity, as shown in FIG. 4). In one embodiment, the force sensor(s) 60 may correspond to one or more strain gauges or load sensors coupled to the disc gang assembly 44 and configured to detect the force exerted by the draft load on a component(s) of the disc gang assembly 44 as the disc blades 46 are being pulled through the ground. Additionally or alternatively, one or more of the force sensors 60 may be configured as a load pin or cell configured to be provided in operative association with the disc gang assembly 44 to monitor the draft load applied thereto.

As shown in FIG. 3, the force sensor(s) 60 may, in one embodiment, be mounted directly to component(s) of the disc gang assembly 44. For instance, in the illustrated embodiment, the force sensor(s) 60 is mounted directly to one or more disc blades 46 of the disc gang assembly 44 in order to detect the load acting on the disc gang assembly 44 as the disc blades 46 are being pulled through the ground. In another embodiment, as illustrated, the force sensor(s) 60 may be mounted to the disc gang shaft 56 of the disc gang assembly 44 in order to detect the load acting on at least one component the disc gang assembly 44. In a still further embodiment, the force sensor(s) 60 may be mounted to the toolbar 48 in order to detect the load acting on at least one component the disc gang assembly 44. In additional embodiments, as further illustrated in FIG. 3, the force sensor(s) 60 may be mounted on a hanger 58 coupled between the toolbar 48 and the disc blades 46. It should be further appreciated that the force sensor(s) 60 may be arranged between various components of the ganged disc assembly, such as between the hanger 58 and the toolbar 48 and/or gang shaft 56 or between the disc blade(s) 46 and the gang shaft 56.

As an example, the force sensor(s) 60 may be coupled to the concave and/or convex surfaces of one or more of the hangers 58. Alternatively or additionally, the force sensor(s) 60 may be coupled to the top of the hanger 58 and/or between the hanger 58 and the toolbar 48. As another example, the force sensor(s) 60 may be coupled to the bottom of the hanger 58 and/or between the hanger 58 and the gang shaft 56. In embodiments where the ganged tool assembly is a tool assembly, the force sensor(s) may be coupled between the hanger 58 and an individual ground engaging tool or a shaft or other intermediary structure used to couple the ground engaging tool to the hanger 58.

Referring briefly back to FIG. 2, the force sensor(s) 60 may be configured to detect the down force applied to the ganged disc assembly 44, which may be indicative of the draft load applied to the disc blades 46. In such an embodiment, the force sensor(s) 60 may correspond to any suitable sensor (e.g., a load cell or pin) and may be configured to be positioned at any suitable location relative to ganged tool assembly 44 that allows the sensor(s) 60 to monitor the down force applied to the ganged tool assembly 44 (e.g., by positioning the sensor 60 at or adjacent to a rotational axis of the ganged tool assembly 44). It should be appreciated that the sensor 60 of FIG. 2 is illustrated at a rotational axis between the actuator 104 and the frame 48. However, the sensor 60 may additionally or alternatively be placed at a rotational axis between the actuator 104 and the ganged tool assembly 44 and/or to the actuator 104, such as to the rod 106, an exterior of the cylinder 108, or an interior of the cylinder 108.

It should be appreciated that FIGS. 2 and 3 provide examples of various different locations for mounting force sensors 60 associated with a disc gang assembly 44. One of ordinary skill in the art will readily appreciate that the disc gang assembly 44 described need not include each of the force sensors 60 shown in FIGS. 2 and 3. For instance, embodiments of the disc gang assembly 44 may only include one of the force sensors 60 shown in FIG. 3 or FIG. 2. It should be appreciated that, in alternative embodiments, the force sensor(s) 60 may be configured as any other suitable device for sensing or detecting a parameter indicative of the load applied to the ganged tool assembly 44, such as to the disc blades 46. It should be appreciated that although the force sensor(s) 60 has been described in the context of a ganged tool assembly, one or more force sensors 60 may, for example, be provided in operative association with the ground engaging tool(s) of each ganged tool assembly to allow the draft load associated with the respective ground engaging tools to be monitored. Still further, one or more force sensors 60 may be provided, for example, in operative association with the ground engaging tool of a tool assembly to allow the draft load associated with the ground engaging tool to be monitored.

Referring now to FIG. 4, a schematic view of one embodiment of a system 100 for monitoring and/or controlling the operation of a tool assembly and/or ganged tool assembly of a tillage implement is illustrated in accordance with aspects of the present subject matter. More particularly, the system 100 may further generally detect the operational status of a tillage implement, such as one or more ground engaging tools of a tillage implement. In general, the system 100 will be described herein with reference to the implement 10, ganged disc assembly 44, and disc blades 46 described above with reference to FIGS. 1-3. However, it should be appreciated by those of ordinary skill in the art that the disclosed system 100 may generally be utilized with tillage implements having any other suitable implement configuration as well as ganged tool assemblies and/or ground engaging tools having any other suitable configuration. Further, though described in reference to a ganged tool assembly, it should be appreciated the following disclosure is generally applicable to a tool assembly including a single ground engaging tool coupled to the frame of the agricultural implement, such as via a hanger 58 and/or toolbar 48.

As shown in FIG. 4, the system 100 may include one or more components of the tillage implement 10 and/or the ganged disc assembly 44. For example, in several embodiments, the system 100 may include one or more sensors configured to capture data indicative of one or more operational parameters of ganged disc assembly 44 and/or disc blades 46, such as the force sensor(s) 60 described above with reference to FIGS. 2 and 3. However, it should be appreciated that, in alternative embodiments, the system 100 may include any other suitable components of the implement 10 and/or ganged disc assembly 44, such as the gang actuator(s) 104.

In accordance with aspects of the present subject matter, the system 100 may include a controller 128 configured to electronically control the operation of one or more components of the implement 10. For instance, in response to an input indicating the implement 10 is in a cultivating state, the controller 128 may be configured to lower various ground engaging tools of the tillage implement 10, such as the disc blades 46, shanks 50, leveling blades 52, and/or basket assemblies 54, and raise such ground engaging tools in response to an input indicating the implement 10 is in a traveling state. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 5. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle 12 to allow for the disclosed system 100 and method 200 to be implemented without requiring additional software to be uploaded onto existing control devices of the implement 10 or the associated work vehicle 12.

Furthermore, in one embodiment, the system 100 may also include a user interface 102. More specifically, the user interface 102 may be configured to provide feedback (e.g., notifications associated with the operational parameters of the ganged disc assembly 44 and/or the disc blades 46) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within a cab 22 of the work vehicle 12 configured to tow the implement 10 across the field. However, in alternative embodiments, the user interface 102 may have any suitable configuration and/or be positioned in any other suitable location.

In several embodiments, the controller 128 may be configured to monitor one or more operational parameters of the ganged disc assembly 44 and/or the associated ground engaging tools of the ganged disc assembly (e.g. the disc blades 46) as the implement 10 is being moved across the field. Specifically, in one embodiment, the controller 128 may be communicatively coupled to the force sensor(s) 60 associated with the disc blades 46 of one or more ganged disc assemblies 44 via a wired or wireless connection to allow operational parameter data (e.g., as indicated by dashed lines 136 in FIG. 4) to be transmitted from the force sensor(s) 60 to the controller 128. As such, the controller 128 may be configured to determine or estimate the draft load acting on the disc blades 46 as the disc blades 46 are being pulled through the ground based on the data 136 received from the sensor(s) 60. For instance, the controller 128 may include a look-up table, suitable mathematical formula, and/or algorithms stored within its memory 132 that correlates the sensor data 136 to the load acting on the disc blades 46.

Generally, by monitoring the data 136 associated with the load acting on the disc blades 46, the controller 128 may be able to determine whether a given disc blade 46 has become plugged or clogged. Specifically, during operation of the implement 10, the ganged disc assembly 44 (e.g., the disc blades 46) may push foreign substances, such as debris and clods, out of the direction of travel 14 of each ganged disc assembly 44 while simultaneously cultivating the soil. In doing so, a draft load may act on each disc blade 46 and/or ganged disc assembly 44 as the disc blades 46 cultivate the soil and move such foreign substance out of the direction of travel of each ganged disc assembly 44. Furthermore, in certain situations a cyclical up and down force and/or bounce may act on the disc blades 46 while the disc blades 46 cultivate the soil and moves such debris out of the path of the ganged disc assembly 44. However, in certain situations, the disc blades 46 may become clogged with debris and no longer cultivate the soil or clear the debris causing such clog. In such situations, the disc blades 46 may undesirably plow through the debris and/or the ground resulting in an increase in the draft load applied to the disc blades 46 and/or ganged disc assembly 44. In other situation, such debris may become caught between the disc blades 46 and the soil and allow the disc blades 46 to skim over the surface of the soil, resulting in a decrease in the draft load applied to the disc blades 46 and/or ganged disc assembly 44. Furthermore, in some circumstances, such a clog may cause the magnitude of the generally cyclical up and down force and/or bounce acting on the disc blades 46 to be reduced. As such, a reduction in the draft load applied to the disc blades 46, an increase in the draft load applied to the disc blades 46, and/or a reduction in the range of the cyclical up and down force acting on the disc blades 46 may indicate that the disc blades 46 are clogged and require corrective measures.

Accordingly, in several embodiments, the controller 128 may be configured to monitor the sensor data 136 received from the sensor(s) 60 and compare one or more monitored values (e.g., draft load associated with the ganged disc assembly 44 and/or disc blades 46) to a predetermined threshold value(s) set for the disc blades 46. The threshold value(s) may, for example, correspond to a load value(s) (including load ranges) selected such that, when the monitored load value(s) differs from the corresponding threshold value(s), it may be inferred that the disc blades 46 are plugged or clogged. It should be appreciated that the predetermined threshold value(s) may be the same for each disc blade 46 and/or ganged disc assembly 44. However, in an alternative embodiment, one or disc blades 46 and/or ganged disc assemblies 44 may define distinct predetermined threshold values.

In additional or alternative embodiments, the sensor data 136 received from the force sensor(s) 60 may be monitored to determine instantaneous load values for the disc blades 46 and/or average load values for the disc blades 46 over time. When using sensor data 136, the predetermined threshold value(s) used by the controller 128 to detect plugging may, for example, correspond to a predetermined load threshold. For example, the predetermined load threshold may be selected as the minimum load of the disc blades 46 indicating that the disc blades 46 are not clogged or plugged (e.g., are not skimming over the surface of the soil to be cultivated). In such instance, the controller 128 may be configured to identify a given disc blade 46 and/or ganged disc assembly 44 as being plugged when the monitored load value drops below the predetermined load threshold for a predetermined length of time. For example, a plug may be indicated when the monitored load value drops below the predetermined load threshold and stays there for the predetermined length of time. As another example, the predetermined load threshold may be selected as the maximum load of the disc blades 46 indicating that the disc blades 46 are not clogged or plugged (e.g., are not plowing the plug along the soil to be cultivated). In such instance, the controller 128 may be configured to identify a given disc blade 46 and/or ganged disc assembly 44 as being plugged when the monitored load value increases above the predetermined load threshold for a predetermined length of time. For example, a plug may be indicated when the monitored load value increases above the predetermined load threshold and stays there for the predetermined length of time.

In one exemplary embodiment, the sensor data 136 received from the force sensor(s) 60 may be monitored to determine a range of loads acting on one or more of the disc blades 46 over time. For instance, the controller 128 may monitor the sensor data 136 to determine an amplitude of a change in the draft load applied to the disc blade(s) 46 of the ganged disc assembly 44 as the cyclical up and down force and/or bounce acts on the disc blades 46 during the operation of the implement 10. In such an exemplary embodiment, the predetermined threshold value(s) used by the controller 128 to detect plugging may, for example, correspond to a predetermined range of loads for the disc blades 46. For instance, the predetermined range of loads may correspond to a minimum difference between the maximum and minimum loads acting on the disc blades 46, indicating that the disc blades 46 are not clogged or plugged. In such instance, the controller 128 may be configured to identify that a disc blade(s) 46 is plugged when the monitored range of loads of the disc blade(s) 46 drops below the predetermined range of loads.

In an additional or alternative embodiment, the controller 128 may be configured to determine one or more disc blades 46 are plugged by comparing monitored data 136 associated with multiple disc blades 46 across multiple ganged disc assemblies 44 of the implement 10. For instance, the controller may 128 be configured to monitor the sensor data 136 received from the disc blades 46 and/or ganged disc assembly 44 and compare the monitored sensor data 136 to monitored sensor data 136 received from sensor(s) 60 associated with second disc blades (e.g., disc blades 46 of a separate ganged disc assembly 44). In such instance, the controller 128 may be configured to identify the disc blades 46 as plugged when a monitored value indicative of the draft load acting on the disc blades 46 differs from a second monitored value indicative of draft load acting on the second disc blades of the separate ganged disc assembly by a given threshold. In one embodiment, the controller 128 may be configured to determine the disc blades 46 are plugged when the monitored load value of the disc blades 46 differs (e.g., is more or less than by a predetermined amount) from the second monitored load value of the second disc blades for a predetermined length of time. In another exemplary embodiment, the controller 128 may be configured to determine the disc blades 46 are plugged when the range of loads acting on the disc blades 46 differs (e.g., is less than by predetermined amount) from the range of loads acting on the second disc blades for a predetermined length of time. In one arrangement, the disc blades 46 may be positioned at or adjacent to the first side 34 of the implement 10 (see FIG. 1), and the second disc blades may be positioned at or adjacent to the second side 36 of the implement 10. As such, the loads acting on the ganged disc assemblies 44, disc blades 46, ganged tool assemblies, tool assemblies, and/or ground engaging tools at or adjacent to opposite sides 34, 36 of the implement 10 may be compared to determine if one or more of the ground engaging tools are plugged.

Though the above determination is based on the comparison of the loads acting on the disc blades 46 of two ganged disc assemblies 44, it is contemplated such comparison may be utilized with any desirable number of disc blades 46 and associated ganged disc assemblies 44. For instance, the monitored draft load acting on the disc blades may be compared to monitored draft loads acting on each of the additional disc blades and/or ganged disc assemblies 44 to determine whether the disc blades 46 are plugged.

Furthermore, the controller 128 may be configured to initiate one or more control actions when the controller 128 determines that one or more of the disc blades 46 are plugged. For example, the controller 128 may be configured to notify the operator of the implement 10 that one or more disc blades 46 are plugged. Specifically, in one embodiment, the controller 128 may be communicatively coupled to the user interface 102 via a wired or wireless connection to allow feedback signals (e.g., indicated by dashed line 138 in FIG. 4) to be transmitted from the controller 128 to the user interface 102. In such an embodiment, the feedback signals 138 may instruct the user interface 102 to provide a notification to the operator of the implement 10 (e.g., by causing a visual or audible notification or indicator to be presented to the operator) that provides an indication that one or more of the disc blades 46 are plugged. In such instances, the operator may then choose to initiate any suitable corrective action he/she believes is necessary, such as adjusting the downforce applied to the ganged tool assembly 44 and/or adjusting the position of the disc blade(s) 46. For example, the operator may adjust the actuator 104 by retracting the rod 106. As such, the disc blades 46 may rise from an operational position relative to the ground surface as the implement is being moved to a raised position and allow any debris or plug to clear the disc blades 46. Additionally, raising the disc blades 46 may reduce a down force applied to the ganged disc assembly 44 and cause any debris or plug of the disc blade(s) 46 to force the ganged disc assembly 44 upward and allow the disc blades 46 to clear such obstruction. Additionally, as described below, the controller 128 may be configured to actively control the ganged disc assembly 44 when it is determined that one or more disc blades 46 are plugged.

In accordance with aspects of the present subject matter, the controller 128 may be configured to control the operation of the ganged disc assembly 44 and/or disc blades 46 based on the monitored operational parameter(s) deriving from the sensor data 136. Specifically, as shown in FIG. 4, the controller 128 may be communicatively coupled to one or more components of the ganged disc assembly 44, such as the gang actuator 104, via a wired or wireless connection to allow control signals (e.g., indicated by dashed lines 146 in FIG. 4) to be transmitted from the controller 128 to the actuator 104. As such, the controller 128 may be configured to transmit control signals 146 to actuator 104 or associated components instructing the actuator 104 to adjust the downforce being applied to the ganged disc assembly 44 and/or disc blades 46, such as by extending or retracting the actuator's rod 106 relative to the corresponding cylinder 108. For example, when it is determined that one or more of the disc blades 46 are plugged (e.g., when the monitored load drops above or below the predetermined load threshold, when the range of loads drops below the predetermined range of loads threshold, and/or when the monitored loads or range of loads differs between disc blades 46 and/or ganged disc assemblies 44), the controller 128 may be configured to transmit control signals 146 to the actuator 104 instructing the actuator 104 to raise the ganged disc assembly 44, and thus the disc blades 46, from the operational position to the raised position and/or reduce the downforce being applied to the disc blades 46. Additionally, or alternatively, the controller 128 may be configured to transmit control signals to the work vehicle to stop forward motion of the agricultural implement 10. Further, the controller 128 may be configured to transmit control signals to reverse the direction of movement of the agricultural implement 10 to reposition the agricultural implement 10, raise the plugged ganged disc assembly 44 to a raised position, resume forward movement of the agricultural implement 10 past the previous position and the plug, and lower the ganged disc assembly 44 to a cultivating position to continue the cultivating operation.

Figure 5:
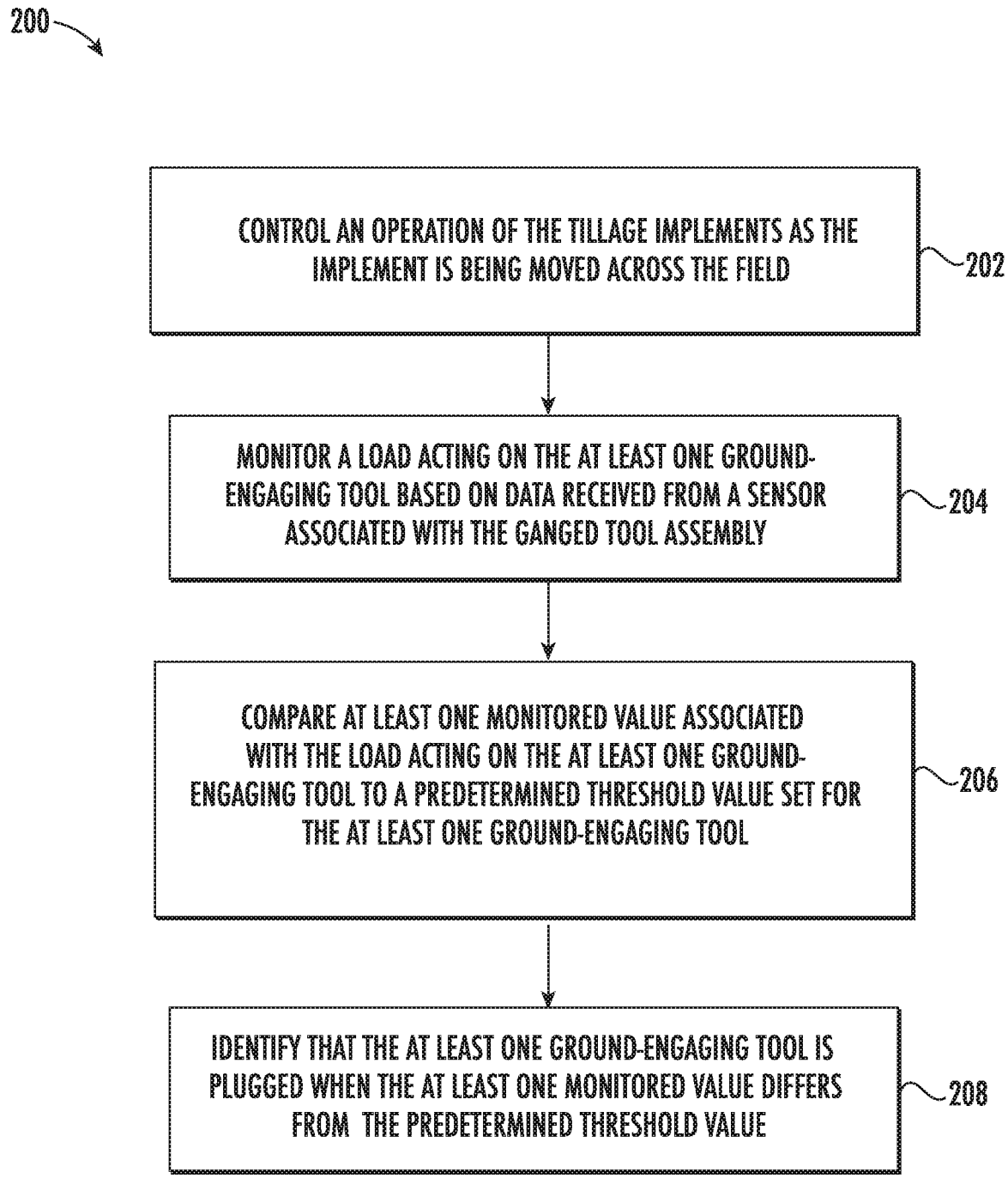
FIG. 5 illustrates a flow diagram of one embodiment of a method for detecting the operational status of a ground engaging tool of a tillage implement in accordance with aspects of the present subject matter.

Referring now to FIG. 5, a flow diagram of one embodiment of a method 200 for detecting the operational status of one or more ground engaging tool of a tillage implement is illustrated in accordance with aspects of the present subject matter. In general, the method 200 will be described herein with reference to the tillage implement 10 and the system 100 described above with reference to FIGS. 1-4. However, it should be appreciated by those of ordinary skill in the art that the disclosed method 200 may generally be utilized to detect the operational status of any tillage implement including one or more ganged tool assemblies and associated ground engaging tools having any suitable implement configuration and/or in connection with any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include controlling an operation of a tillage implement as the implement is being moved across the field. For instance, as described above, the controller 128 may be configured to control the operation of one or more components of the tillage implement 10 as the implement 10 is being moved across the field.

Additionally, at (204), the method 200 may include monitoring a load acting one or more ground engaging tools based on data received from a sensor associated with the ganged tool assembly. For instance, as described above, the controller 128 may be communicatively coupled to one or more sensors, such as a force sensor(s) 60, which are configured to capture data 136 indicative of a draft load applied to the disc blade(s) 60. As such, the controller 128 may be configured to monitor the draft load applied to one or more of the disc blades 46 based on the sensor data 136 received from the force sensor(s) 60.

Additionally, at (206), the method 200 may include comparing at least one monitored value associated with the load acting on the ground engaging tool(s) to a predetermined threshold value set for the ground engaging tool(s). For example, as described above, the controller 128 may be configured to monitor the load acting on the disc blade(s) 46 based on data 136 received from the force sensor(s) 60 and compare such monitored load a predetermined load threshold value set for the disc blade(s) 46. As an additional or alternative example, the controller 128 may be configured to monitor a range of loads acting on the disc blade(s) 46 over time based on data 136 received from the force sensor(s) 60 and compare such monitored range of loads to a predetermined range of loads threshold value set for the disc blade(s) 46.

Furthermore, at (208), the method 200 may include identifying that the ground engaging tool(s) is plugged when the at least one monitored value differs from the predetermined threshold value. In one instance, as described above, the controller 128 may be configured to identify that a disc blade(s) 46 is plugged when the load acting on the disc blade(s) 46 drops below the predetermined load value for a predetermined length of time. In an additional or alternative example, the controller 128 may be configured to identify that a disc blade(s) 46 is plugged when the load acting on the disc blade(s) 46 increases above the predetermined load value for a predetermined length of time. In a still further example, the controller 128 may be configured to identify that a disc blade(s) 46 is plugged when the range of loads acting on the disc blade(s) 46 drops below the predetermined range of loads threshold. As an alternative or additional example, the controller 128 may be configured to identify that the disc blade(s) 46 is plugged when the load and/or range of loads acting on the disc blade(s) 46 differs from a second load and/or range of loads acting on a second disc blade(s) for a predetermined length of time.

Moreover, the method 200 may, for example, include initiating a control action when an occurrence of plugging has been identified. For example, as described above, when plugging is identified, the controller 128 may be configured to notify an operator of the tillage implement 10, automatically adjust a position of the disc blade(s) 46 relative to a ground surface across which the tillage implement 10 is being moved between an operational position and a raised position, and/or adjust a downforce being applied to the disc blade(s) 46. Specifically, as described above, the controller 128 may be configured to transmit control signals 138 to the user interface 102 and/or transmit control signals 146 to the gang actuator(s) 104 to adjust one or more operating parameters of the disc blade(s) 46, such as the position of the disc blade(s) 46 and/or the downforce being applied thereto, based on the detection of plugging. As another example, the controller 128 may be configured to transmit control signals to stop the forward movement of the agricultural implement 10, reverse the direction of movement of the agricultural implement 10 to reposition the agricultural implement 10, raise the plugged disc blade(s) 46 to a raised position, resume forward movement of the agricultural implement 10 past the plug, and/or lower the disc blade(s) 46 to a cultivating position to continue the cultivating operation.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting an operational status of a ground engaging tool of a tillage implement, the system comprising:
   an agricultural implement including a frame and a tool assembly supported relative to the frame, the tool assembly including a toolbar coupled to the frame and at least one ground engaging tool coupled to the toolbar;
   a sensor coupled to the tool assembly and positioned between the toolbar and the at least one ground engaging tool, the sensor configured to capture data indicative of a draft load acting on the at least one ground engaging tool; and
   a controller configured to monitor the draft load acting on the at least one ground engaging tool relative to at least one predetermined threshold value, the controller being further configured to identify the at least one ground engaging tool as being plugged when the monitored draft load differs from the predetermined threshold value.

2. The system of claim 1, wherein the tool assembly is configured as a ganged tool assembly, the ganged tool assembly including a plurality of the ground engaging tools coupled to the toolbar.

3. The system of claim 1, wherein the at least one predetermined threshold value comprises a predetermined load threshold, the controller being configured to identify the at least one ground engaging tool as being plugged when the monitored draft load drops below the predetermined load threshold for a predetermined length of time.

4. The system of claim 1, wherein the at least one predetermined threshold value comprises a predetermined load threshold, the controller being configured to identify the at least one ground engaging tool as being plugged when the monitored draft load increases above the predetermined load threshold for a predetermined length of time.

5. The system of claim 1, wherein the at least one predetermined threshold value comprises a predetermined range of loads threshold, the controller being configured to monitor a range of draft loads acting on the at least one ground engaging tool relative to the predetermined range of loads threshold and identify the at least one ground engaging tool as being plugged when the monitored range of draft loads drops below the predetermined range of loads threshold.

6. The system of claim 1, wherein the controller is further configured to initiate a control action when the controller identifies that the at least one ground engaging tool is plugged.

7. The system of claim 6, wherein the control action comprises at least one of notifying an operator of the tillage implement that the at least one ground engaging tool is plugged, adjusting a position of the at least one ground engaging tool relative to a ground surface across which the tillage implement is being moved between an operational position and a raised position, or adjusting a downforce being applied to the at least one ground engaging tool.

8. The system of claim 1, wherein the controller is further configured monitor data received from a second sensor coupled to a second tool assembly, the second sensor configured to capture data indicative of the draft load acting on at least one ground engaging tool of the second tool assembly, and wherein the controller is configured to identify the at least one ground engaging tool of the tool assembly as plugged when the monitored draft load acting on the at least one ground engaging tool of the second tool assembly differs from the monitored draft load acting on the at least one ground engaging tool of the tool assembly by the at least one predetermined threshold value or more.

9. The system of claim 1, wherein the sensor comprises at least one of a strain gauge, load cell, or force sensor.

10. The system of claim 1, wherein the tool assembly further includes at least one hanger coupled between the at least one ground engaging tool and the toolbar, wherein the sensor is coupled to the at least one hanger.

11. The system of claim 1, wherein the at least one ground engaging tool comprises at least one disc blade.

12. A method for detecting an operational status of at least one ground engaging tool of a tillage implement, the implement including an implement frame and a tool assembly supported relative to the frame, the tool assembly including a toolbar coupled to the frame and the at least one engaging tool coupled to the toolbar, the method comprising:
controlling, with a computing device, an operation of the tillage implement as the implement is being moved across a field;
monitoring, with the computing device, a draft load acting on the at least one ground engaging tool and transferred to the toolbar based on data received from a sensor associated with the tool assembly;
comparing the monitored draft load to at least one predetermined threshold value set for the at least one ground engaging tool; and
identifying that the at least one ground engaging tool is plugged when the monitored draft load differs from the at least one predetermined threshold value.

13. The method of claim 12, wherein comparing the monitored load to the at least one predetermined threshold value comprises comparing the monitored load to a predetermined load threshold value set for the at least one ground engaging tool.

14. The method of claim 13, wherein identifying that the at least one ground engaging tool is plugged comprises identifying that the at least one ground engaging tool is plugged when the monitored load drops below the predetermined load value for a predetermined length of time.

15. The method of claim 13, wherein identifying that the at least one ground engaging tool is plugged comprises identifying that the at least one ground engaging tool is plugged when the monitored load increases above the predetermined load value for a predetermined length of time.

16. The method of claim 12, wherein comparing the monitored load to the predetermined threshold value comprises comparing a range of loads acting on the at least one ground engaging tool over time to a predetermined range of loads threshold value set for the at least one ground engaging tool.

17. The method of claim 16, wherein identifying that the at least one ground engaging tool is plugged comprises identifying that the at least one ground engaging tool is plugged when the range of loads acting on the at least one ground engaging tool drops below the predetermined range of loads threshold.

18. The method of claim 12, further comprising:
initiating, with the computing device, a control action when the monitored load differs from the at least one predetermined threshold value, the control action comprises at least one of notifying an operator of the tillage implement that the at least one ground engaging tool, adjusting a position of the at least one ground engaging tool relative to a ground surface across which the tillage implement is being moved between an operational position and a raised position, or adjusting a downforce being applied to the at least one ground engaging tool.

19. The method of claim 12, wherein the tool assembly further includes at least one hanger coupled between the at least one ground engaging tool and the toolbar, wherein the sensor is coupled to the at least one hanger.

20. A system for detecting an operational status of a ground engaging tool of a tillage implement, the system comprising:
an agricultural implement including a frame, a first tool assembly supported relative to the frame, the first tool assembly including a first toolbar coupled to the frame and a first ground engaging tool coupled to the toolbar, and a second tool assembly supported relative to the frame, the second tool assembly including a second toolbar coupled to the frame and a second ground engaging tool coupled to the toolbar;
a first sensor coupled to the first toolbar, the first sensor configured to capture data indicative of a first load acting on the first ground engaging tool;
a second sensor coupled to the second toolbar, the second sensor configured to capture data indicative of a second load acting on the second ground engaging tool; and
a controller configured to monitor the first load acting on the first ground engaging tool based on data provided by the first sensor and the second load acting on the second ground engaging tool based on data provided by the second sensor, the controller being further configured to identify the first ground engaging tool or the second ground engaging tool as plugged based on a difference in the first load or the second load deviating from a predetermined range.

* * * * *